United States Patent
Jung et al.

(10) Patent No.: US 6,353,496 B1
(45) Date of Patent: Mar. 5, 2002

(54) WAVELENGTH DIVISION MULTIPLEXING ERBIUM DOPED FIBER AMPLIFIER WHICH OUTPUTS CONSTANT POWER PER CHANNEL AND AMPLIFYING METHOD THEREOF

(75) Inventors: Rae-sung Jung, Suwon; Seong-taek Hwang, Pyeongtaek; Jeong-mee Kim, Yongin, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/413,798

(22) Filed: Oct. 7, 1999

(30) Foreign Application Priority Data

Oct. 7, 1998 (KR) .......................................... 98-41860

(51) Int. Cl.$^7$ ................................................ H01S 3/00
(52) U.S. Cl. ......................... 359/341; 359/334; 359/124
(58) Field of Search ................................ 359/341, 337, 359/124

(56) References Cited

U.S. PATENT DOCUMENTS 5,815,299 A    9/1998   Bayart et al.
5,864,422 A  * 1/1999   Miyazaki et al. ............ 359/341

FOREIGN PATENT DOCUMENTS

| EP | 0 772 264 A2 | 5/1997 |
| EP | 0777346 | 6/1997 |
| EP | 0805571 | 11/1997 |
| EP | 0829981 | 3/1998 |
| EP | 0946006 | 9/1999 |
| JP | 9-18415 | 1/1997 |
| JP | 10-4231 | 1/1998 |
| JP | 10-51057 | 2/1998 |
| JP | 10-107735 | 4/1998 |
| JP | 10-262032 | 9/1998 |

OTHER PUBLICATIONS

Notice to Submit Response, Korean Industrial Property Office, Feb. 27, 2001.
English Translation of the Notice to Submit Response, Korean Industrial Property Office, Feb. 27, 2001.

* cited by examiner

Primary Examiner—Mark Hellner
(74) Attorney, Agent, or Firm—Robert E. Bushnell, Esq.

(57) ABSTRACT

A wavelength division multiplexing erbium doped fiber amplifier (WDM-EDFA) which outputs constant power per channel, and an amplification method thereof, are provided. The WDM-EDFA for amplifying received signal light of a plurality of channels which are multiplexed, includes a power control unit for generating dummy light whose output power is controlled according to a first control value, and controlling the power of received signal light by coupling the dummy light to the received signal light, an optical fiber amplification unit for amplifying signal light power-controlled by the power control unit, using pumping light generated according to a second control value, and a controller for supplying the first control value to the power control unit to obtain dummy light power corresponding to the difference between the power value of the received signal light and a predetermined target power value, and supplying the second control value to the optical fiber amplification unit to obtain pumping light power required to amplify the received signal light. Thus, a transient effect of the WDM-EDFAs, in which a plurality of channels are multiplexed and amplified, can be eliminated by controlling the power of incident signal light of added/dropped channels.

16 Claims, 2 Drawing Sheets

WAVELENGTH DIVISION MULTIPLEXING ERBIUM DOPED FIBER AMPLIFIER WHICH OUTPUTS CONSTANT POWER PER CHANNEL AND AMPLIFYING METHOD THEREOF

CLAIM OF PRIORITY

This application makes reference to, incorporates the same herein, and claims all benefits accruing under 35 U.S.C §119 from an application entitled Wavelength Division Multiplexing Erbium Doped Fiber Amplifier Which Outputs Constant Power Per Channel, And Amplifying Method Thereof earlier filed in the Korean Industrial Property Office on Oct. 7, 1998, and there duly assigned Serial No. 98-41860 by that Office.

BACKGROUND OF THE INVENTION

1. Field of the Invention

The present invention relates to a wavelength division multiplexing erbium doped fiber amplifier (WDM-EDFA) having constant output power per channel and an amplifying method thereof, and more particularly, to a WDM-EDFA which keeps constant output power for each channel when the number of channels is changed.

2. Description of the Related Art

WDM-EDFAs output a constant output power per channel (hereinafter referred to as COP), depending on the wavelength band and the power of received signal light or the number of channels in a gain-flattened wavelength area of a given EDFA. For example, assuming that the power of signal light amplified and output by the WDM-EDFA is required to be +5d Bm/channel when the central wavelength interval of received signal light for each channel is 0.8 nm and the power of the received signal light is −20 dBm/channel in a 16 channel WDM optical transmission system, a controller of the WDM-EDFA receives information about the number of channels from the optical transmission system and controls the WDM-EDFA in accordance with the required output conditions of the WDM-EDFA.

FIG. 1 is a configuration view of an exemplary WDM-EDFA. The amplifier of FIG. 1 includes a first optical coupler 102, a first photoelectric converter 104, a first isolator 106, an amplification unit 108, a second isolator 110, a second optical coupler 112, a second photoelectric converter 114, and a controller 116. Reference numerals 100 and 1 18 denote an input connector and an output connector, respectively.

In the operation of the conventional WDM-EDFA, the first optical coupler 102 divides signal light received through the input connector 100 at a ratio of 1 to 99. The first photoelectric converter 104 converts the 1% of signal light which was divided from the signal light by the first optical coupler 102, into an electrical signal, and transmits the electrical signal to the controller 116. The controller 116 measures the amplitude of the converted signal and controls the amplification level of the amplification unit 108. The amplification unit 108 amplifies the 99% of signal light which was divided from the signal light by the first optical coupler 102. The second optical coupler 112 divides signal light amplified by the amplification unit 108 at a ratio of 1 to 99. The second photoelectric converter 114 converts the 1% of signal light which was divided from the signal light by the second optical coupler 112 into an electrical signal and outputs the electrical signal to the controller 116. The controller 116 measures the amplitude of the signal converted by the second photoelectric converter 114 and controls the amplification level of the amplification unit 108. The first isolator 106 prevents amplified spontaneous emission (ASE) generated by the amplification unit 108 from degrading the amplification efficiency by being reflected by the first optical coupler 102 and reapplied to the amplification unit 108. Similarly, the second isolator 110 prevents ASE generated by the amplification unit 108 from degrading the amplification efficiency by being reflected by the second optical coupler 112 and reapplied to the amplification unit 108. However, when adding/dropping of channels occurs in a WDM optical transmission system, signal light is instantaneously transmitted via an optical fiber, but channel information is transmitted after a predetermined delay time. FIG. 2 shows an example of a variation in the output per channel of a WDM-EDFA according to the transmission time difference between signal light and control light including channel information.

If the number of channels is changed from 16 to 8, the power of incident signal light is reduced to a power for 8 channel signal light, so that the WDM-EDFA, which makes COP control suitable for 16 channels as shown in a section 200, increases the output per channel to keep the total output power constant. At this time, overshoot such as that in a section 202 occurs. That is, channel information associated with a variation in the number of channels reaches the controller after a predetermined delay time, so that the time delay causes a transient effect such as overshoot. Reference numeral 204 denotes a section where amplification control with respect to 8 channels is performed.

SUMMARY OF THE INVENTION

An objective of the present invention is to provide a WDM-EDFA which keeps the output power per channel constant even when the state of channels is changed, by installing a power control portion for controlling the power of signal light in the front portion of the WDM-EDFA, and an amplification method thereof.

To achieve the above objective, the present invention provides a wavelength division multiplexing erbium doped fiber amplifier (WDM-EDFA) having constant output power per channel, which amplifies received signal light of a plurality of channels which are multiplexed, the WDM-EDFA including: a power control unit for generating dummy light whose output power is controlled according to a first control value, and controlling the power of received signal light by coupling the dummy light to the received signal light; an optical fiber amplification unit for amplifying signal light power-controlled by the power control unit, using pumping light generated according to a second control value; and a controller for supplying the first control value to the power control unit to obtain dummy light power corresponding to the difference between the power value of the received signal light and a predetermined target power value, and supplying the second control value to the optical fiber amplification unit to obtain pumping light power required to amplify the received signal light.

To achieve the above objective, the present invention provides a method of amplifying a wavelength division multiplexing erbium doped fiber, including the steps of: measuring the power of received signal light and obtaining the difference between the measured power value and a predetermined target power value; generating dummy light having output power as large as the obtained difference; coupling the generated dummy light to the received signal light and outputting the coupled light; and amplifying the coupled light.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
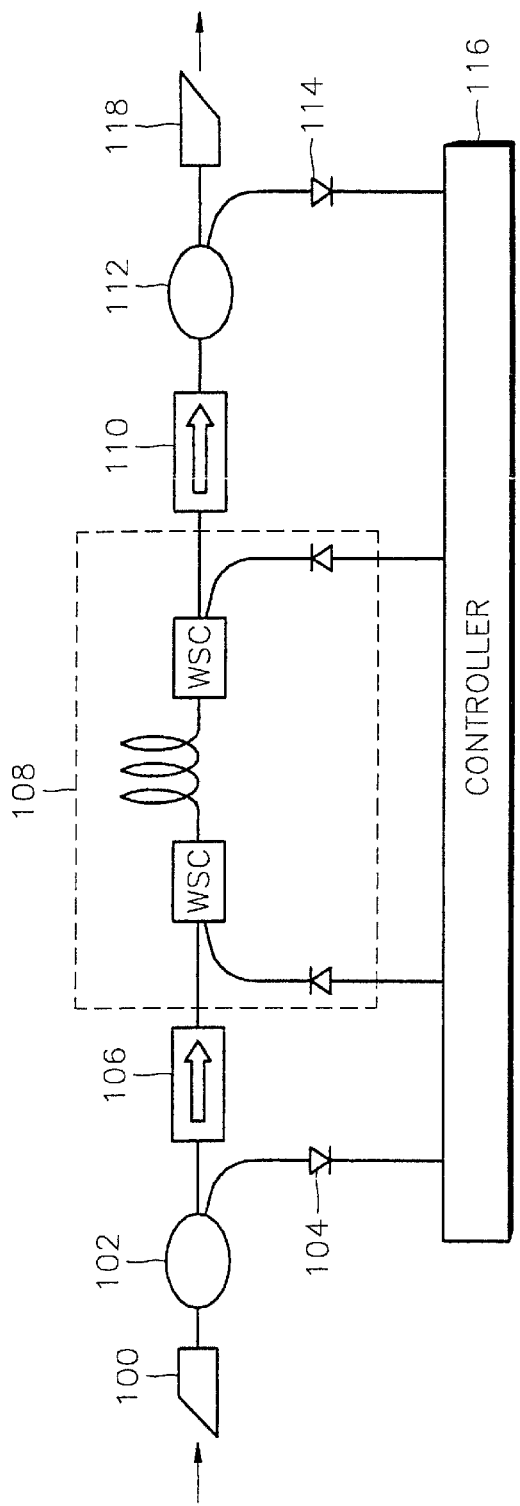
FIG. 1 is a configuration diagram of a conventional WDM-EDFA.
Figure 2:
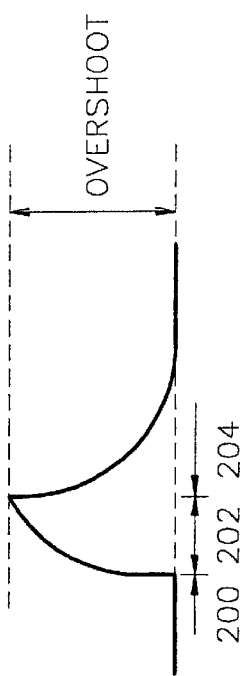
FIG. 2 illustrates the variation in the output power per channel of a WDM-EDFA according to the transmission time difference between signal light and control light including channel information.
Figure 3:
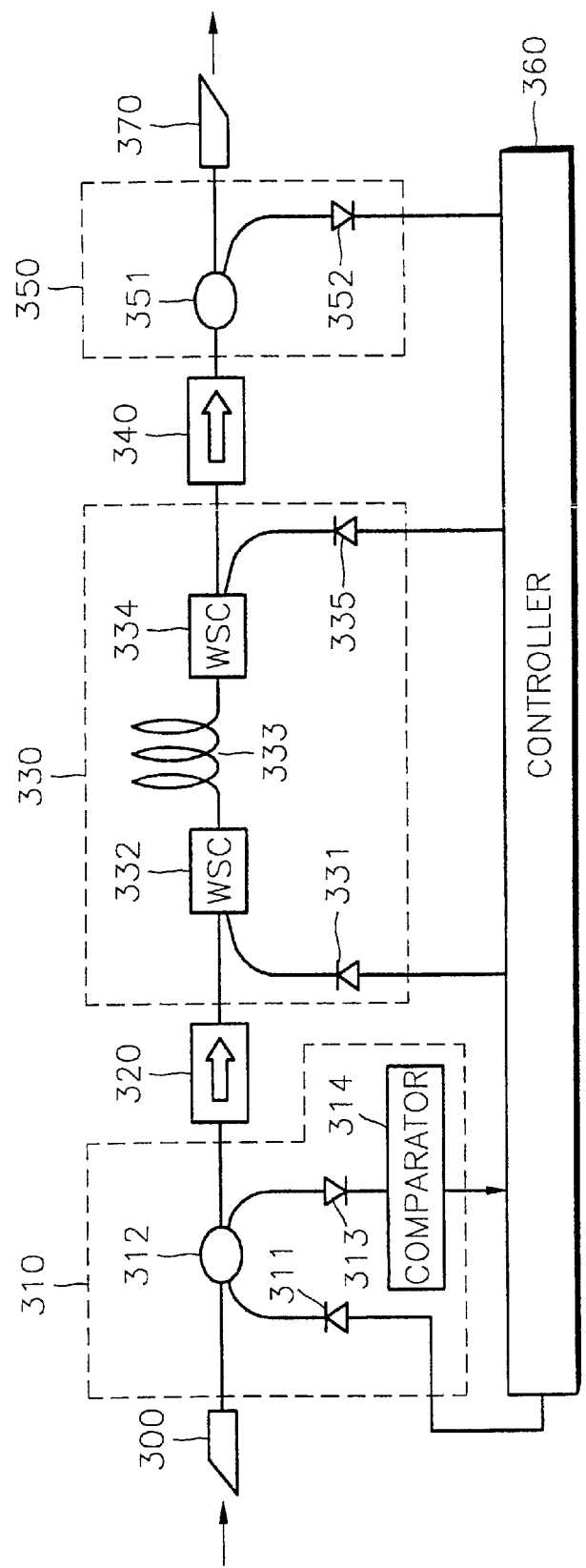
FIG. 3 is a configuration diagram of a WDM-EDFA which keeps constant output power per channel, according to the present invention.

Referring to FIG. 3, a WDM-EDFA according to the present invention which keeps constant output power per channel, includes a power control unit 310, a first isolator 320, an amplification unit 330, a second isolator 340, an output power check unit 350, and a controller 360. The power control unit 310 controls the power of received signal light. The amplification unit 330 amplifies the received signal light. The output power check unit 350 checks the power of signal light amplified by the amplification unit 330. Reference numerals 300 and 370 are an input connector and an output connector, respectively.

The power control unit 310 includes an electro optic converter 311, a first optical coupler 312, a first photoelectric converter 313, and a comparator 314.

The amplification unit 330 includes a first pumping light source 331, a first wavelength selective coupler (WSC) 332, an erbium doped fiber (EDF) 333, a second WSC 334, and a second pumping light source 335.

The output power check unit 350 includes a second optical coupler 351 and a second photoelectric converter 352.

In the operation of the WDM-EDFA according to the present invention, when signal light is received through the input connector 300, the first optical coupler 312 divides input signal light at a ratio of 1 to 99 so that 99% of the signal light is applied to the optical fiber amplification unit 330 via the first isolator 320 and 1% of the signal light is converted into an electrical signal by the first photoelectric converter 313. The comparator 314 compares the total power of the received signal light with the total power of signal light required by the EDF 333. When the total power of the received signal light is smaller than the total power of signal light required by the EDF 333, the controller 360 controls the driving current of the electrooptic converter 311 connected to the first optical coupler 312 so that the electro optic converter 311 outputs power corresponding to the difference. The electro optic converter 311 generates dummy light according to a controlled driving current. The generated dummy light is coupled to the received signal light by the first optical coupler 312, so that the total power of signal light applied to the optical fiber amplification unit 330 is controlled. Here, the electro optic converter 311 is a laser diode which generates light of wavelengths which are not used for the received signal light.

The optical fiber amplification unit 330 amplifies signal light whose power is controlled by the power control unit 310. The first and second pumping light sources 331 and 335 generate pumping light according to the driving current which is controlled by the controller 360. The driving current of each of the first and second pumping light sources 331 and 335 is determined by the amplification gain of the EDF 333. Pumping light generated by the first and second pumping light sources 331 and 335 is applied to the EDF 333 via the first and second WSCs 332 and 334, respectively. When the pumping light excites erbium (Er) ions in the EDF 333, signal light is amplified by stimulated emission of excited erbium.

If the number of channels of signal light transmitted at constant power for each channel is dropped from 16 channels to 8 channels, the power of received signal light is smaller than the reference power required by the EDF 333, and the controller 360 controls the power of the received signal light by adjusting the driving current of the electro optic converter 311. The optical fiber s amplification unit 330 has output power corresponding to 16 channels, but the power per channel of the signal light of 8 channels is constant.

The second optical coupler 351 divides signal light amplified by the optical fiber amplification unit 330 at a ratio of 1 to 99, and 1% of the divided signal light is converted into an electrical signal by the second photoelectric converter 352 for input to controller 360. Controller 360 checks the power of the amplified signal light and adjusts the amplification level of the optical fiber amplification unit 330 by checking the intensity of optical signal from the electrical signal output from the second photodiode 352 and controlling the intensity of pumping light of the first and second pumping light sources 331 and 335.

The first isolator 320 prevents ASE generated by the optical fiber amplification unit 330 from degrading the amplification efficiency by being reflected by the first optical coupler 312 and reapplied to the optical fiber amplification unit 330. Similarly, the second isolator 340 prevents ASE generated by the optical fiber amplification unit 330 from degrading the amplification efficiency by being reflected by the second optical coupler 351 and reapplied to the optical fiber amplification unit 330.

According to the present invention, a WDM-EDFA, in which a plurality of channels are multiplexed and amplified, can remove a transient effect and keep a constant output power per channel of the WDM-EDFA, by controlling the power of incident signal light of added/dropped channels.

What is claimed is:

1. A wavelength division multiplexing erbium doped fiber amplifier (WDM-EDFA) having constant output power per channel, which amplifies received signal light of a plurality of channels which are multiplexed, the WDM-EDFA comprising:

a power control unit for generating dummy light whose output power is controlled according to a first control value, and controlling the power of received signal light by coupling the dummy light to the received signal light;

an optical fiber amplification unit for amplifying signal light power-controlled by the power control unit, using pumping light generated according to a second control value; and a controller for supplying the first control value to the power control unit to obtain dummy light power corresponding to the difference between the power value of the received signal light and a predetermined target power value, and supplying the second control value to the optical fiber amplification unit to obtain pumping light power required to amplify the received signal light.

2. The WDM-EDFA of claim 1, wherein the power control unit comprises:
- an optical coupler for dividing the received signal light at a predetermined ratio and outputting one of the divided signal light groups to the optical fiber amplification unit;
- a photoelectric converter for converting the remaining divided signal light into an electrical signal;
- a comparator for comparing the power of the electrical signal with a predetermined power value; and
- an electro optic converter for converting an electric signal generated by the first control value output by the controller according to the output of the comparator, into an optical signal, and supplying the optical signal as the dummy light to the optical coupler.

3. The WDM-EDFA of claim 2, wherein the electro optic converter is a laser diode which generates light of wavelengths which are not used as the received signal light.

4. The WDM-EDFA of claim 1, further comprising:
- an optical coupler for dividing an optical signal amplified by the optical fiber amplification unit, at a predetermined ratio; and
- a photoelectric converter for converting one of the signal light groups into which the optical signal is divided by the optical coupler, into electrical signals, and outputting the electrical signals to the controller, wherein the controller checks the power of the signal light amplified by the optical fiber amplification unit and determines the second control value.

5. The WDM-EDFA of claim 2, further comprising:
- a second optical coupler for dividing an optical signal amplified by the optical fiber amplification unit, at a predetermined ratio; and
- a second photoelectric converter for converting one of the signal light groups into which the optical signal is divided by the second optical coupler, into electrical signals, and outputting the electrical signals to the controller, wherein the controller checks the power of the signal light amplified by the optical fiber amplification unit and determines the second control value.

6. The WDM-EDFA of claim 4, further comprising:
- a first isolator coupled between said power control unit and said optical fiber amplification unit; and
- a second isolator coupled between said optical fiber amplification unit and said second optical coupler.

7. A method of amplifying a wavelength division multiplexing erbium doped fiber, comprising the steps of:
- measuring the power of received signal light and obtaining the difference between the measured power value and a predetermined target power value;
- generating dummy light having output power as large as the obtained difference;
- coupling the generated dummy light to the received signal light and outputting the coupled light; and
- amplifying the coupled light.

8. The method of claim 7, further comprising a step of controlling the amplification level by checking the power of light amplified in said amplifying step.

9. A wavelength division multiplexing erbium doped fiber amplifier (WDM-EDFA) having constant output power per channel, which amplifies received signal light of a plurality of channels which are multiplexed, the WDM-EDFA comprising:

- a power control unit determining a difference between a power value of received signal light and a predetermined target power value and generating dummy light having an output power controlled according to a first control value in response to said difference to control the power of the received signal light by coupling the dummy light to the received signal light;
- an optical fiber amplification unit amplifying signal light power-controlled by the power control unit, using pumping light generated according to a second control value, wherein said predetermined target power value is equal to a total power of signal light required by an erbium doped fiber of said optical fiber amplification unit;
- an output power check unit converting output signal light from said optical fiber amplification unit into an electrical signal; and
- a controller supplying the first control value to the power control unit in response to said difference, and supplying the second control value to the optical fiber amplification unit to obtain pumping light power required to amplify the received signal light in response to said electrical signal.

10. The WDM-EDFA of claim 9, said power control unit comprising:
- an optical coupler dividing the received signal light at a predetermined ratio and outputting a first portion of said received signal light to said optical fiber amplification unit;
- a photoelectric converter receiving a second portion of said received signal light from said optical coupler and converting the second portion of said received signal light into an electrical signal;
- a comparator comparing the power value of the received signal light with the predetermined target power value of signal light required by said optical fiber amplification unit by comparing said electrical signal to a predetermined value to determine said difference between said power value of said received signal light and said predetermined target power value; and
- an electro optic converter converting the first control value, output by the controller according to the difference determined by the comparator, into an optical signal, and supplying the optical signal as said dummy light to the optical coupler.

11. The WDM-EDFA of claim 10, said electro optic converter comprising a laser diode which generates light of wavelengths which are not used as the received signal light.

12. The WDM-EDFA of claim 9, said output power check unit comprising:
- an optical coupler dividing an optical signal amplified by the optical fiber amplification unit, at a predetermined ratio and outputting a first portion of said optical signal amplified by the optical fiber amplification unit to an output connector;
- a photoelectric converter receiving, from said optical coupler, a second portion of said of said optical signal amplified by the optical fiber amplification unit and converting the second portion of said optical signal amplified by the optical fiber amplification unit into an electrical signal and outputting the electrical signal to said controller; and
- said controller checking a power of said optical signal amplified by the optical fiber amplification unit in response to said electrical signal to determine the second control value.

13. The WDM-EDFA of claim 10, said output power check unit comprising:
- a second optical coupler dividing an optical signal amplified by the optical fiber amplification unit, at a predetermined ratio and outputting a first portion of said optical signal amplified by the optical fiber amplification unit to an output connector;
- a second photoelectric converter receiving, from said second optical coupler, a second portion of said optical signal amplified by the optical fiber amplification unit and converting the second portion of said optical signal amplified by the optical fiber amplification unit into an electrical signal and outputting the electrical signal to said controller; and
- said controller checking a power of said optical signal amplified by the optical fiber amplification unit in response to said electrical signal to determine the second control value.

14. The WDM-EDFA of claim 13, further comprising:
- a first isolator coupled between said power control unit and said optical fiber amplification unit; and
- a second isolator coupled between said optical fiber amplification unit and said second optical coupler.

15. The method as set forth in claim 1, wherein said predetermined target power value is equal to a total power of signal light required by an erbium doped fiber of said optical fiber amplification unit.

16. The method as set forth in claim 7, wherein said predetermined target power value is equal to a total power of signal light required by an erbium doped fiber in the amplifying step.

* * * * *